Patented Feb. 16, 1932

1,845,018

UNITED STATES PATENT OFFICE

WILLIAM EGGERT, JR., OF BROOKLYN, NEW YORK

METHOD OF PREPARING FERTILIZERS

No Drawing.  Application filed August 31, 1927.  Serial No. 216,786.

The present invention, relating as indicated to a fertilizing compound and a method of making same, is more particularly directed to a new and improved fertilizer containing potassium and to a method of producing the same by a treatment of potassium containing silicates, such as feldspar, to render the potassium content soluble and available to plant life. The principal object of the invention is the provision of a convenient and economical method for treating insoluble silicates to change the insoluble potassium content thereof into a water soluble and available condition in order that it may be readily assimilated by growing plants.

To the accomplishment of the foregoing and related ends, said invention, then, consists of the features hereinafter fully described and particularly pointed out in the claims; the following description setting forth in detail one method and one product exemplifying my invention, such disclosed procedure and product constituting, however, but one of the various applications of the principle of my invention.

It is known that insoluble potassium silicates can be rendered soluble by furnace heating mixtures of silicates, phosphate rock with a mineral acid and a reducing agent to a relatively high temperature, between 900 and 1200 degrees Fahr., but such a process involves the maintenance of this extremely high temperature and is therefore expensive and has not been used to any extent for these reasons. I have found that the insoluble potassium content of feldspar can be rendered soluble, if finely divided feldspar is acted upon by a phosphoric acid or mono-calcium phosphate in a nascent state and under pressure at a temperature of less than 350 degrees Fahr.

My improved process consists in first preparing the feldspar for use by heating it and then suddenly chilling it, which renders the feldspar brittle and very much easier to grind. This friable material is then crushed and pulverized until it is brought into a finely divided condition, in which condition approximately 95% should pass a 100 mesh screen. The finely divided feldspar is next intimately mixed with finely divided phosphate rock, and into this mixture is stirred a sufficient quantity of sulphuric acid, which should preferably be approximately 50° Baumé. The mixing operation may be carried out directly in the apparatus in which the mixture is next to be heated, which should be an autoclave or similar pressure heating vessel provided with agitating means and with suitable steam coils or steam jackets for heating.

After the mixture has been thoroughly stirred and the feldspar, phosphate rock and acid are thoroughly intermixed the autoclave is closed and the mixture is heated to a temperature of from 250 to 350 degrees Fahr. for a period of from one to three hours, depending upon the amount of impurities present and the degree of fineness of the mixture. A typical mixture contains approximately equal parts by weight of feldspar, containing 10% of $K_2O$ and phosphate rock containing 34% of $P_2O_5$ and an equal amount of sulphuric acid having a gravity of 50° Baumé. It will be understood that these proportions may be varied, depending upon the impurities of the feldspar and phosphate rock, as well as on the degree of fineness of the material, the length of the heating period and the exact temperature maintained.

Under the above conditions the feldspar decomposes, the action taking place being represented by the following type equations:—

(1) $K_2O.Al_2O_3.6SiO_2$ & $4H_2SO_4$ under pressure = $K_2SO_4$ & $Al_2(SO_4)_3$ & $4H_2O$ & $6SiO_2$.

(2) $Ca_3P_2O_8$ & $3H_2SO_4 = 3CaSO_4$ & $2H_3PO_4$.

(3) $K_2O.Al_2O_3.6SiO_2$ & $3H_3PO_4$ in statu nascendi and under pressure = $K_2HPO_4$ & $Al_2P_2O_8$ & $4H_2O$ & $6SiO_2$.

(4) $Al_2P_2O_8$ & $3H_2SO_4 = Al_2(SO_4)_3$ & $2H_3PO_4$.

(5) $K_2O.Al_2O_3.6SiO_2$ & $2H_3PO_4 = K_2O.Al_2O_3.P_2O_5.3SiO_2$ & $3H_2O$ & $3SiO_2$.

Mono-calcium phosphate may also be used, and in that case the reactions which occur are similar to those set forth in the above equations.

After the treatment of the material in the autoclave is concluded the treated mass of material is removed, allowed to dry and cool off, and may then if necessary be crushed to eliminate any lumps which may have been formed, after which the material is in condition for use. The original potassium content of the feldspar is converted by the above treatment to potassium phosphate and potassium sulphate which are soluble and which render the potassium content of the spar fully available for plant life. There may also be formed by the action of nascent phosphoric acid upon the feldspar a phospho-silicate of potassium, as the finished product generally carries a water insoluble but available potassium compound (see Equation 5). The present process is simple and economical and produces a new and highly useful fertilizing compound.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:—

1. A method of utilizing the potassium content of potassium-containing silicates, which comprises heating under pressure a mixture of such a silicate and phosphatic material with sulphuric acid to a temperature not exceeding 350° F.

2. A method of rendering avaliable the potassium content of potassium-containing silicates, which comprises heating under pressure a mixture of substantially equal parts of finely divided feldspar and phosphate rock with sulphuric acid, at a temperature of 250°–350° F.

Signed by me, this 26th day of August, 1927.

WILLIAM EGGERT, Jr.